United States Patent
Baskerville

[11] Patent Number: 5,888,044
[45] Date of Patent: Mar. 30, 1999

[54] SEED CART WITH LOADING/UNLOADING CONVEYOR SYSTEM

[75] Inventor: Gregory Eugene Baskerville, Jolley, Iowa

[73] Assignee: DewEze Manufacturing, Inc., Harper, Kans.

[21] Appl. No.: 655,010

[22] Filed: May 29, 1996

[51] Int. Cl.$^6$ ..................................................... B65G 67/02
[52] U.S. Cl. .......................... 414/523; 198/311; 198/317; 198/318; 414/345; 414/528
[58] Field of Search .................................... 414/523, 528, 414/327, 343, 345, 390, 391, 393, 398, 526; 198/311, 312, 317, 318

[56] References Cited

U.S. PATENT DOCUMENTS

| | | | |
|---|---|---|---|
| 3,498,483 | 3/1970 | Meharry | 414/523 |
| 3,863,783 | 2/1975 | Spellman, Jr. | 414/523 |
| 4,119,223 | 10/1978 | Fiechter | 198/317 X |
| 4,411,581 | 10/1983 | Niewold | 414/523 X |
| 4,433,946 | 2/1984 | Christianson et al. | 414/523 X |
| 4,541,767 | 9/1985 | Daberkow | 414/523 |
| 4,742,938 | 5/1988 | Niewold | 414/523 X |
| 5,104,613 | 4/1992 | Humphrey | 414/523 X |
| 5,108,249 | 4/1992 | Kinzenbaw et al. | 414/523 |
| 5,257,893 | 11/1993 | Sevits | 414/523 |
| 5,484,249 | 1/1996 | Klatt | 414/523 |
| 5,520,495 | 5/1996 | Sukup | 414/523 |

OTHER PUBLICATIONS

Sales literature of J & M Manufacturing Co., Inc., Fort Recovery, Ohio for Uni–Swivel Hydraulic Augers, Models USA–13 and USA–15, exact publication date unknown, but at least one year prior to the filing of the present application.

Sales literature of Kill Brothers Company, Delphos, Ohio for Grain Box Augers Models 112, 114 & 115, exact publication date unknown, but at least one year prior to the filing of the present application.

Sales literature of Unverferth Manufacturing Co., Inc., Kalida, Ohio for Unverferth 16' Gravity Box Auger, exact publication date unknown, but at least one year prior to the filing of the present application.

Sales literature of Friesen of Iowa, Inc., Storm Lake, Iowa for Bulk Seed Tender, Seed Loading and Delivery System, exact publication date unknown, but at least one year prior to the filing of the present application.

Sales literature of Unverferth Manufacturing Co., Inc., Kalida, Ohio for UM Grain Box Augers, exact publication date unknown, but at least one year prior to the filing of the present application.

Sales literature of Unverferth Manufacturing Co., Inc., Kalida, Ohio for Hydraulic Grain Body Augers, exact publication date unknown, but at least one year pror to the filing of the present application.

(List continued on next page.)

Primary Examiner—David A. Bucci
Attorney, Agent, or Firm—Litman, McMahon, & Brown

[57] ABSTRACT

A bulk seed cart includes a seed bin with sloping sides converging at a bottom mounted discharge hopper to which a conveyor is removably connected for unloading seed from the cart. The conveyor is supported by a telescoping boom mounted on the side of the cart and the boom, and attached conveyor, can be raised or lowered via an attached hydraulic lifting cylinder. The boom can be pivoted from side to side and the conveyor is attached to the boom via a swivel assembly, which, once the conveyor is detached from the seed cart, allows the conveyor to be swiveled 180 degrees and attached to a nearby source of seed, such as another seed cart, a stationary bin, a truck or railroad car, etc., with the conveyor being directed toward the seed bin in the seed cart. Seed can thus be unloaded from the source and loaded into the seed cart via the conveyor. The lifting cylinder, the telescoping boom and the conveyor motor are all controllable via a single remote control module.

13 Claims, 4 Drawing Sheets

OTHER PUBLICATIONS

Sales literature of Clay Equipment Corporation, Cedar Falls, Iowa for Clay Bulk Seed Handlers, exact publication date unknown, but at least one year prior to the filing of the present application.

Sales literature of Clay Equipment Corporation, Cedar Falls, Iowa for Clay Seed Conveyor, exact publication date unknown, but at least one year prior to the filing of the present application.

Sales literature of Remlinger Manufacturing Co., Inc., Kalida, Ohio for Gravity Box and Folding Truck Augers, exact publication date unknown, but at least one year prior to the filing of the present application.

Sales literature of Christianson Systems, Inc., Blomkest, Minnesota for SEED VAC Bulk Seed Conveyor, exact publication date unknown, but at least one year prior to the filing of the present application.

Sales literature of Sudenga Industries, Inc., George, Iowa for Gravity Wagon Auger, exact publication date unknown, but at least one year prior to the filing of the present invention.

Sales literature of Sudenga Industries, Inc., George, Iowa for Endgate Auger, exact publication date unknown, but at least one year prior to the filing of the present invention.

Sales literature of Sudenga Industries, Inc., George, Iowa for Seed Carton Unloaders, exact publication date unknown, but at least one year prior to the filing of the present invention.

Sales literature of Sudenga Industries, Inc., George, Iowa for Bulk Seed Caddy, exact publication date unknown, but at least one year prior to the filing of the present invention.

Sales literature of Parker Industries, Jefferson, Iowa for Bulk Seed Tender Model 2611S, publication date at least one year prior to the filing of the present invention.

Sales literature of Quality Plus Manufacturing, Oelwein, Iowa for The Bulk Seed Handling System, publication date unknown, not admitted prior art.

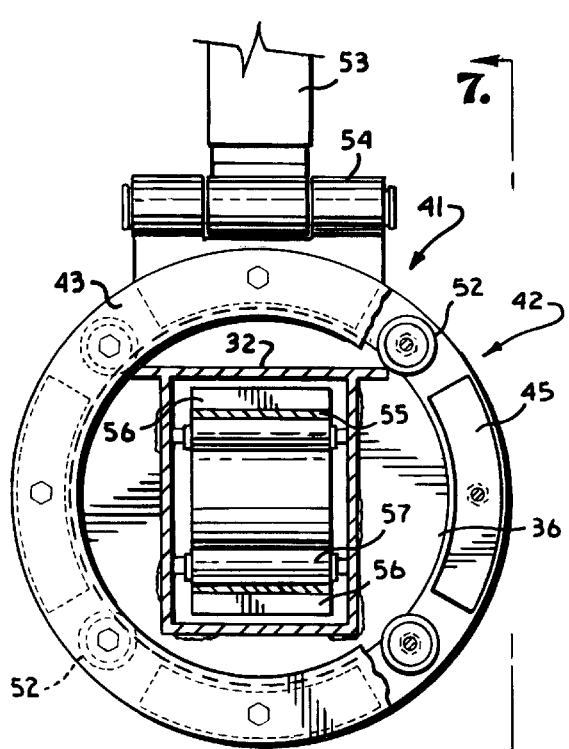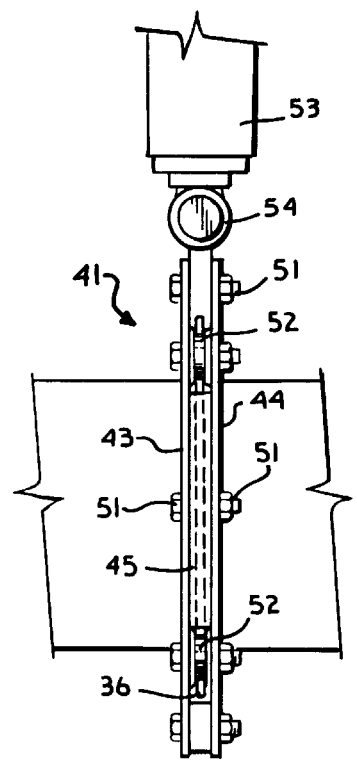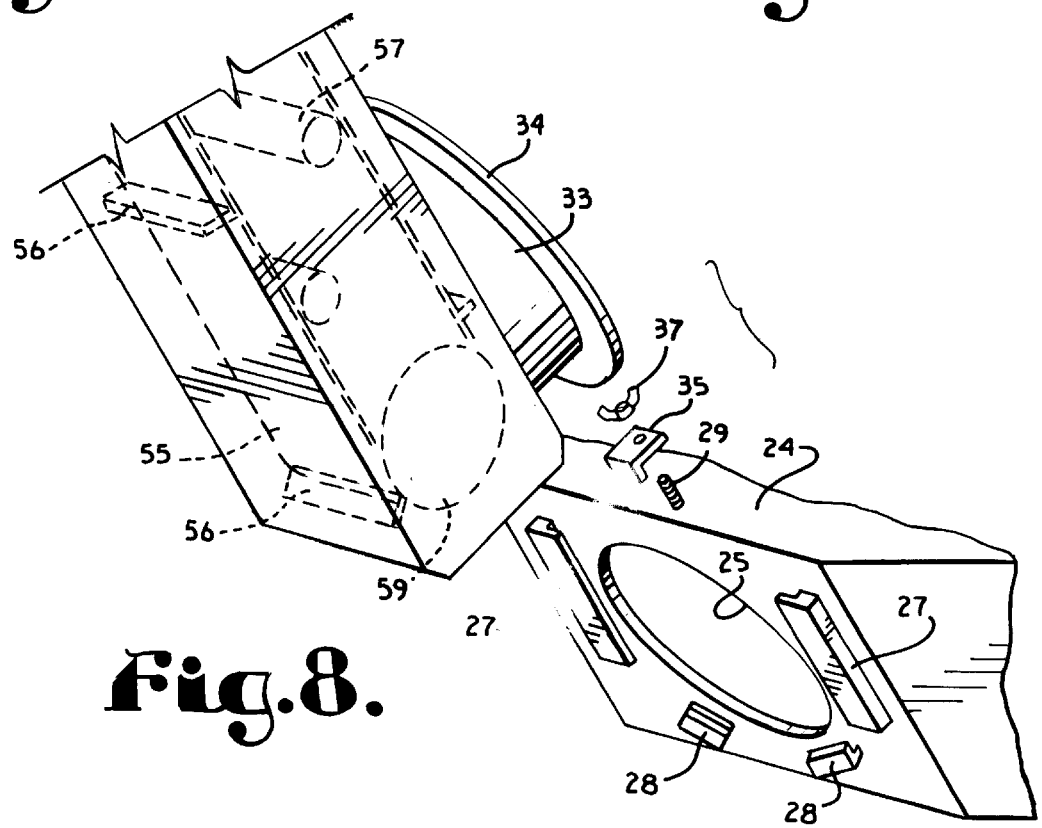

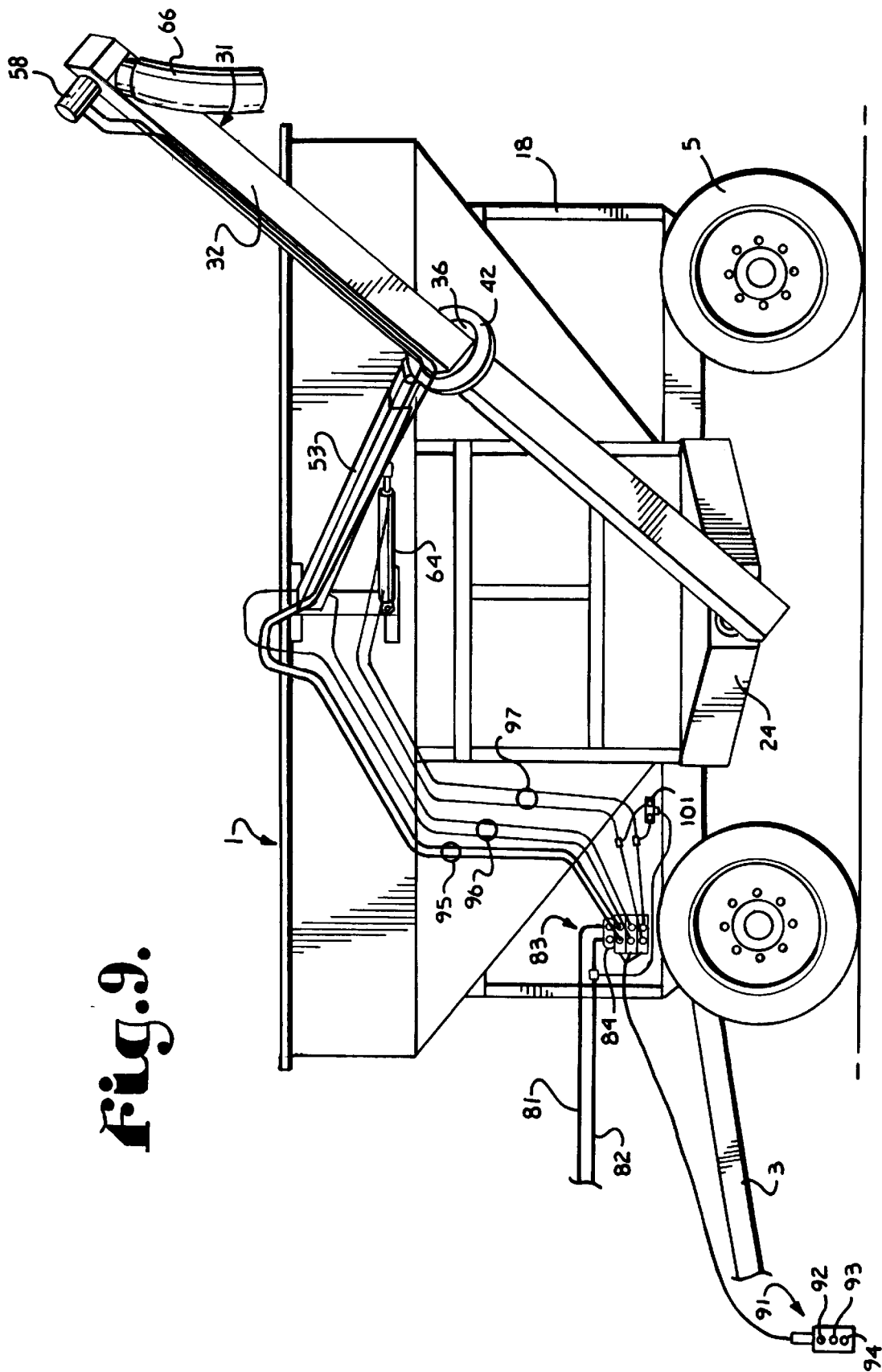

SEED CART WITH LOADING/UNLOADING CONVEYOR SYSTEM

BACKGROUND OF THE INVENTION

1. Field of the Invention

The present invention relates generally to a bulk seed cart of the type used to transport and discharge bulk certified seed and other particulate agricultural products. The inventive cart is equipped with a belt-type conveyor which is detachably coupled to a discharge hopper positioned proximate the bottom of the seed cart. The conveyor is supported by a swivel attached to the end of a telescoping boom assembly. The conveyor can thus be pivoted from side to side and lifted or lowered via the boom assembly. In addition, the conveyor can be removed from its connection to the seed cart, swiveled 180 degrees, and used to load seed into the seed cart.

2. Description of the Related Art

Seed for agricultural operations has traditionally been sold and distributed in relatively small quantities, such as 50 lb. bags. As modern agricultural operations have increased in size and demands for efficiency have increased, seed producers have started delivering seed in larger, bulk quantities. A number of manufacturers have produced specialized carts for handling this bulk seed. These carts typically include a conveyor attached proximate the bottom of the seed cart for off-loading the seed. While grain carts typically use auger-type conveyors, some seed carts, due to the rather fragile nature of the seed, have incorporated belt-type conveyors instead. One version of bulk seed cart is described in U.S. Pat. No. 5,257,893 to Sevits. The Sevits cart includes a frame designed to receive and dispense large bulk bags of seed by dropping them downward into a chute from a spout formed in the bottom of the bag. A built-in auger conveyor then collects the seeds from the chute and conveys them up the conveyor to a destination, such as to bins in a planter or seed drill. The auger convey can be pivoted from side to side to vary the dispensing angle of the seeds.

A problem with seed carts such as that described in the Sevits patent, as well as with more conventional carts which resemble grain carts, but with specialized features for accommodating and dispensing loose bulk seed, is the loading of seed into the cart. For example, in the case of the Sevits cart, heavy bulk bags must be loaded mechanically via a fork lift, crane or the like, which, for field operations, can be impossible, and is, at best, inconvenient for many other operations. In the case of more conventional carts, loose seed must typically be loaded from above the cart, or, if from ground level, via a separate belt or auger-type conveyor attachable to seed sources such as storage bins, trucks, etc. Again, such a conveyor is not always readily available, particularly for field operations.

Accordingly, it is clear that a need exists for an improved bulk seed cart with a self contained conveyor which can be used both for loading and for unloading the seed cart. Such a conveyor should be capable of both pivoting side to side to change unloading angles, and should be capable of being removed from the seed cart, swiveled at least 180 degrees, and attached to a seed source such that it can be used to load seed into the cart as well as unload seed out of the cart.

SUMMARY OF THE INVENTION

In the practice of the present invention, a bulk seed cart includes a seed bin with sloping sides converging at a bottom mounted discharge hopper. The hopper includes a discharge opening and a motor driven belt-type conveyor is removably connected to the hopper for unloading seed from the cart and selectively discharging the seed into receptacles, such as seed bins on a planter or seed drill. The conveyor is supported by a telescoping boom mounted on the side of the cart and the boom, and attached conveyor, can be raised or lowered via an attached hydraulic lifting cylinder. The boom can be pivoted from side to side and the conveyor is attached to the boom via a swivel assembly including a swivel plate attached to the conveyor and a swivel ring attached to the boom. The swivel assembly, once the conveyor is detached from the seed cart, allows the conveyor to be swiveled 180 degrees and attached to a nearby source of seed, such as another seed cart, a stationary bin, a truck or railroad car, etc., with the conveyor being directed toward the a seed bin in the seed cart. Seed can thus be unloaded from the source and loaded into the seed cart via the conveyor. The lifting cylinder, the telescoping boom and the conveyor hydraulic motor are all controllable via a single remote control module.

OBJECTS AND ADVANTAGES OF THE PRESENT INVENTION

The objects and advantages of the present invention include: providing an improved bulk seed cart; providing such a seed cart with a storage bin which has sloping sidewalls converging into a discharge hopper attached to the bottom of the bin; providing such a seed cart with a conveyor which is removably attachable to the discharge hopper for unloading seed from the cart; providing such a seed cart in which the conveyor is supported by a telescoping boom which can be selectively raised and lowered and extended and retracted to position the conveyor at a desired angle and in a desired direction; providing such a seed cart in which the conveyor is attached to the boom via a swivel assembly; providing such a seed cart in which the conveyor can be removed from its connection to the cart discharge hopper, swiveled 180 degrees, and attached to a nearby source of bulk feed; providing such a seed cart which can be directed from the source of seed back into the top of the storage bin on the seed cart so as to load seed from the source into the seed cart; providing such a seed cart conveyor which is driven via a hydraulic motor; providing such a seed cart with a push button remote control module which controls the hydraulics for the telescoping boom, the hydraulic lifting cylinder and the conveyor hydraulic motor; and providing such a seed cart which is economical to manufacture, efficient and convenient in operation, capable of a long operating life and which is particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 6 is a greatly enlarged, fragmentary cross-sectional view, taken along line 6—6 of FIG. 1, illustrating a two dimensional swivel mount for the seed cart conveyor.

FIG. 7 is a greatly enlarged, fragmentary cross-sectional view, taken along line 7—7 of FIG. 6, and further illustrating the structure of the swivel mount for the seed cart conveyor.

FIG. 8 is a greatly enlarged, fragmentary perspective view illustrating the removable connection of the belt-type conveyor to the seed cart discharge hopper with the conveyor belt shown in phantom lines.

FIG. 9 is an enlarged, partially schematic, side elevational view of the seed cart of FIG. 1, illustrating the hydraulic system and controls for the conveyor, the telescoping boom and the lifting cylinder.

DETAILED DESCRIPTION OF THE PREFERRED EMBODIMENTS

I. Introduction and Environment

Figure 1:
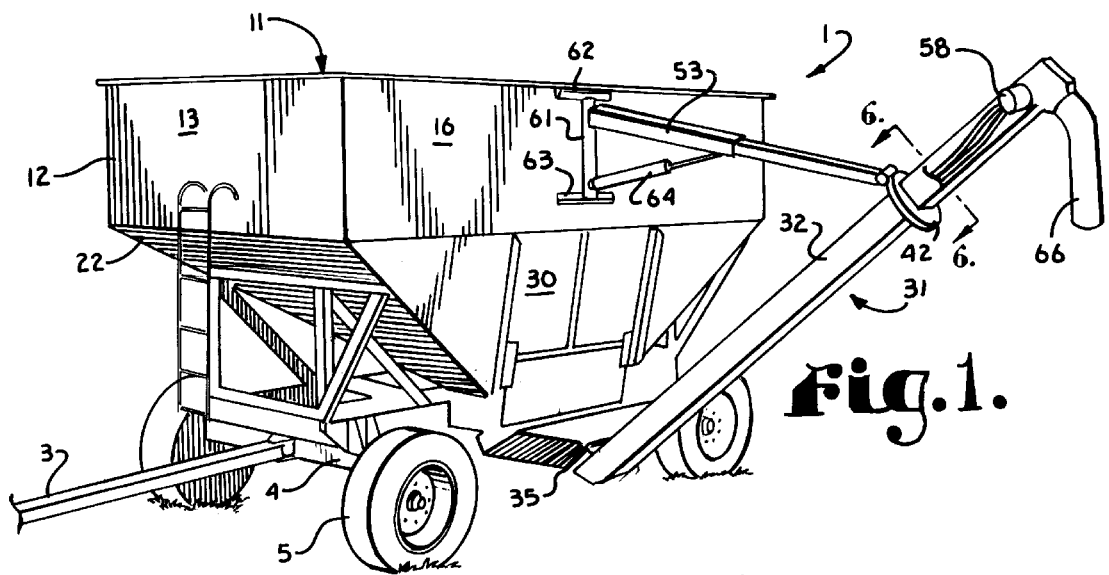
FIG. 1 is a perspective view of a seed cart in accordance with the present invention with an attached conveyor supported by a telescoping boom and lifting cylinder.

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "up", "down", "right" and "left" will refer to directions in the drawings to which reference is made. The words "in" and "out" will refer to directions toward and away from, respectively, the geometric center of the structure being referred to. Said terminology will include the words specifically mentioned derivatives thereof and words of similar import.

II. Seed Cart

Figure 2:
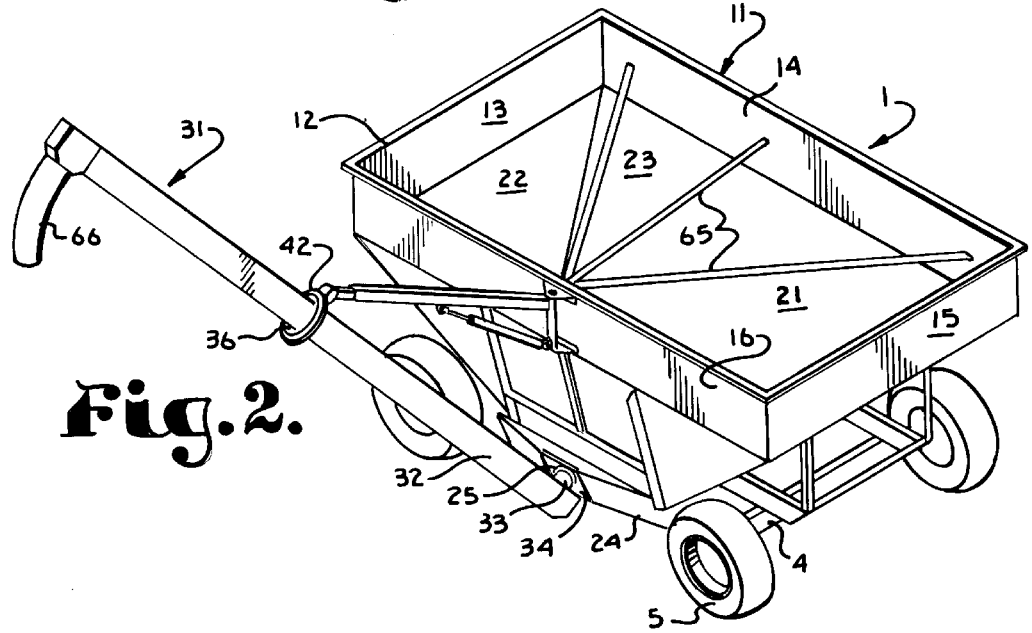
FIG. 2 is another perspective view of the seed cart of FIG. 1, illustrating the interior of the seed bin and a number of cross braces for bracing the telescoping boom and the lifting cylinder.
Figure 3:
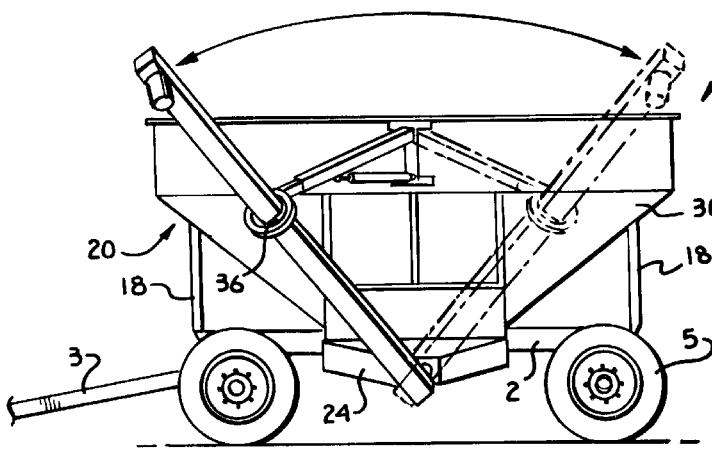
FIG. 3 is a side elevational view of the seed cart of FIG. 1, illustrating the conveyor pivoted to the left in solid lines and, in dotted lines pivoted to the right.

Referring to the drawings in more detail, reference numeral 1 in FIGS. 1–3 generally designates a seed cart in accordance with the present invention. The cart 1 comprises a lower frame 2 connected to a tongue 3. The frame 2 is supported by two axles 4, each with a pair of wheels 5 attached thereto.

A grain bin, generally indicated as 11, comprises an upper portion 12 with substantially vertical sidewalls 13–16. The grain bin 11 is supported by a pair of rectangular frames 18 which are attached to and extend upward from respective opposite ends of the lower frame 2. Extending downward from the upper portion 12, the bin includes a lower portion 20 with three triangular sidewall extensions 21, 22, and 23 (FIG. 2) each of which tapers inward and downward to converge at an inlet (not shown) which opens into a discharge hopper 24. In a conventional fashion, this structure directs all seed or other particulate material stored in the bin 11 toward the discharge hopper 24. The discharge hopper 24 slopes downward and inward toward a circular discharge opening 25 such that all seed or other particulate material in the hopper 24 is directed toward the circular discharge opening 25. The discharge hopper 24 includes a number of brackets 27 and 28 attached to the outside thereof and which partially surround the circular opening 25. A threaded stud 29 extends upward from the top of the discharge hopper 24. The lower portion 20 of the bin 11 includes a fourth triangular sidewall 30 which is oriented substantially vertically.

A belt-type conveyor 31 includes an elongate housing 32 which is preferably rectangular in cross section. A circular flange 33 is connected to and extends outward from the bottom of the conveyor housing 32. The flange 33 mates with the circular opening 25 in the hopper 24 (FIG. 8). The circular flange 33 has attached thereto a perimeter circular plate 34 which is insertable into the brackets 27 and 28 and is retained in position adjacent the opening 25 via a securing wedge 35 fitted onto the threaded stud 29 and held there via a wing nut 37. The conveyor 31 is thus removably coupled to the hopper 24. The conveyor housing 32 is pivotable from side to side relative to the hopper 24, as shown in FIG. 3, while remaining attached thereto.

Approximately two-thirds of the way up the conveyor housing 32, a circular swivel plate 36 is welded about the periphery of the housing 32. The swivel plate 36 forms a part of a swivel assembly 41 which also includes a swivel ring assembly 42. The swivel assembly 41 is best illustrated in FIGS. 6 and 7. The swivel ring assembly 42 includes an upper and a lower ring 43 and 44, respectively, separated by a plurality of spacing bars 45 arrayed about the periphery of the rings 43 and 44. A plurality of threaded bolts and mating nuts 51 extend through the rings 43 and 44 and the spacing bars 45 to clamp the rings 43 and 44 together in a spaced configuration. A plurality of bearing rollers 52 are rotatably held between the rings 43 and 44, with the rollers 52 supporting and engaging the swivel plate 36 such that the swivel plate 36, and the attached conveyor housing 32, can freely swivel 180 degrees or more within the swivel ring assembly 42. The swivel ring assembly 42 is pivotably attached to a telescoping boom 53 via a hinge 54.

FIG. 6 also illustrates the interior of the conveyor housing 32 which encloses an endless conveyor belt 55 which carries a plurality of spaced paddles 56 for carrying seed upward through the conveyor 31. A number of idler rollers 57 keep the belt 55 apart as it passes over itself and a hydraulic conveyor drive motor 58 (FIG. 1) is connected to drive the belt 55. A return conveyor roller 59 is positioned proximate the bottom of the conveyor housing 32 near the circular flange 33.

The telescoping boom 53 is attached near the top of a vertically oriented tube 61 which tube 61 is, in turn, pivotably attached to the upper sidewall 16 of the seed bin 11 via a pair of supports 62 and 63. A hydraulic lifting cylinder 64 is attached at one end to the tube 61 and at a second end to the telescoping boom 53. A plurality of cross braces 65 are positioned inside of the seed bin 11 in order to provided enhanced strength and rigidity to the sidewall 16, and thus to provide adequate support for the telescoping boom 53 and the lifting cylinder 64.

III. Operation

The conveyor 31 can thus be used to unload seed from the cart 1 via the discharge hopper 24, which seed is carried up the conveyor housing 32 via the belt 55 and paddles 56 to the top thereof where the seed enters a flexible discharge tube 66. The combination of the telescoping boom 53, the lifting cylinder 64 and the pivotable connection of the conveyor 31 to the discharge hopper 24 allows discharged seed to be directed at virtually any desired location or height along the conveyor side of the seed cart 1.

Figure 4:
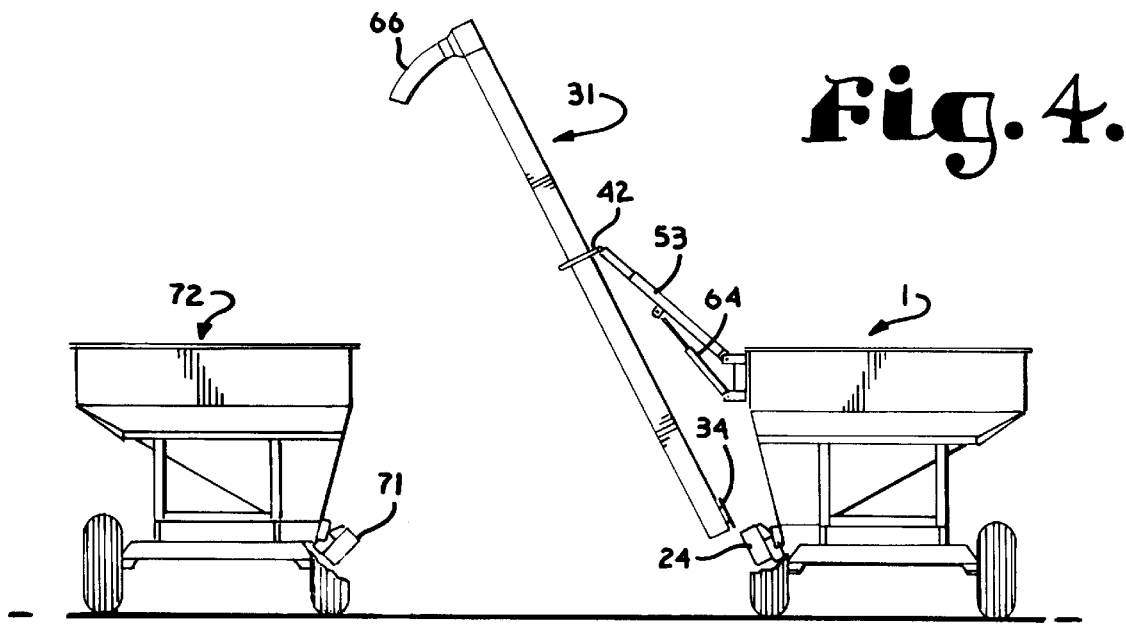
FIG. 4 is a partially schematic end elevational view of the seed cart of FIG. 1 along with a complementary seed source cart which serves as a source of seed for the inventive cart, and with the conveyor being removed from engagement with the inventive cart for connection to the complementary seed source cart.
Figure 5:
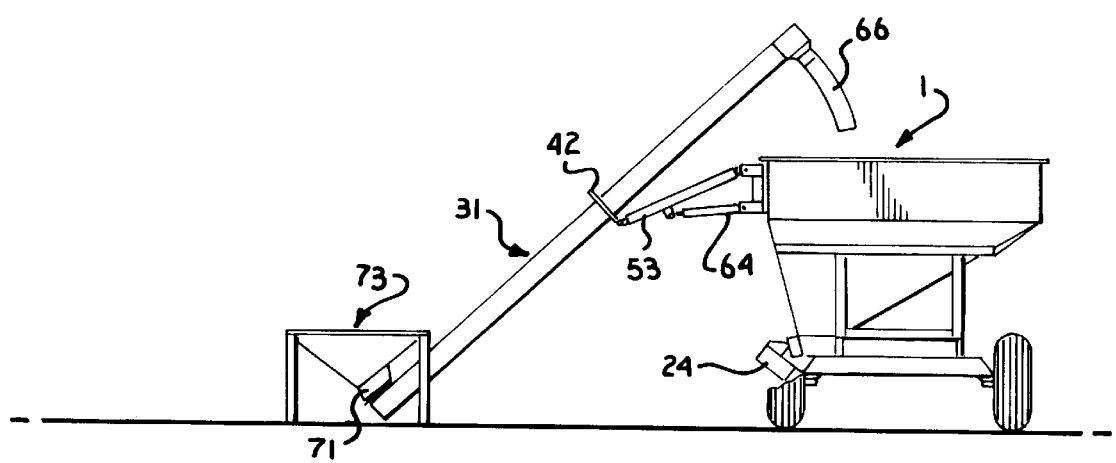
FIG. 5 is a partially schematic end elevational view of the seed cart of FIG. 1 along with a complementary stationary seed source bin, and with the conveyor swiveled 180 degrees and inserted into a mating discharge hopper in the bin.

FIGS. 4 and 5 illustrate the enhanced versatility of the inventive seed cart 1 and conveyor 31. In FIG. 4, the combination of the lifting cylinder 64 and the telescoping boom 53 are used to lift the conveyor 31 out of engagement with the discharge hopper 24 in the seed cart 1. The conveyor 31 is then swiveled 180 degrees relative to the boom 53 via the attached swivel plate 36 and the swivel ring assembly 42. The lifting cylinder 64 and the boom 53 are then lowered, thus allowing the conveyor 31 to be engaged with a mating discharge hopper 71 in a companion seed cart 72 (FIG. 4) or a similar hopper 71 in a companion seed bin 73 (FIG. 5). The conveyor 31, in addition to performing an unloading function, thus also serves a dual function of allowing the seed cart 1 to be loaded from an exterior seed source, such as the cart 72 or the stationary bin 73. Of course, while the cart 72 and the bin 73 have been shown as a seed source for loading the seed cart 1, any suitable source of seed can be connected to the conveyor 31, such as a semi-trailer or railroad car, silo, etc.

IV. Hydraulic System and Control

FIG. 9 illustrates the hydraulic system and control for operation of the seed cart 1. A hydraulic pressure line 81 and a return line 82 are connected to a hydraulic pump on a pulling tractor (not shown). The lines 81 and 82 terminate in a three function solenoid valve 83 equipped with three solenoid controlled valves 84–86. The solenoid valves 84–86 are connected to a wired remote control module 91 equipped with three two-way switches 92–94 which switches 92–94 respectively control the valves 84–86. The solenoid valve 84 is connected to hydraulic line pair 95 which selectively supply and return pressurized hydraulic fluid to and from the hydraulic conveyor drive motor 58. The valve 85 is connected to line pair 96 which selectively supplies and returns pressurized hydraulic fluid to the telescoping boom 53. Finally, the valve 86 is connected to line pair 97 which selectively supplies and returns pressurized hydraulic fluid to the lifting cylinder 64. A dampering float control 101 is provided to bypass excess pressure from the lifting cylinder 64 to dampen any dramatic shifts in the position of the boom 53.

With the seed cart hydraulic system and control illustrated in FIG. 9, an operator can remotely control the lifting and lowering of the boom 53 via the lifting cylinder 64, the extension and retraction of the boom 53 itself, and the on or off state of the conveyor drive motor 58. This allows for much safer and more reliable operation of the seed cart 1 by allowing an operator positioned on the ground to achieve this three way control. It should be noted that, while the remote control module 91 has been illustrated as a wired connection, a radio linked control module could be substituted therefor.

While the cart 1 has been described herein as a bulk seed cart, it should be noted that the present invention, including the detachable, swiveling conveyor 31, can also be used advantageously with grain carts, trucks or other granular materials carriers. While the conveyor 31 has been described as a belt-type conveyor due to the relatively fragile nature of bulk seed, an auger-type conveyor could also be detachable connected in a similar fashion.

It is thus to be understood that while certain forms of the present invention have been illustrated and described herein, it is not to be limited to the specific forms or arrangement of parts described and shown.

What is claimed and desired to be secured by Letters Patent is as follows:

1. A storage and transport vehicle comprising:
   a. a discharge point;
   b. a storage bin connected to said discharge point;
   c. a conveyor detachably connectable to said discharge point, said conveyor including an elongate housing; and
   d. a conveyor support structure, said support structure including a swivel assembly attaching said conveyor housing to said support structure and also including a telescoping boom with an inner end pivotably attached to an exterior side of said bin and a cylinder attached to said boom, said swivel assembly being attached to an outer end of said boom, thus allowing said conveyor to be selectively swiveled at least 180 degrees about said outer end of said boom.

2. A vehicle as in claim 1, wherein said conveyor includes a drive motor, said vehicle further comprising a remote control which allows an operator to selectively extend and retract said telescoping boom, to selectively extend and retract said lifting cylinder, and to selectively start and stop said conveyor motor.

3. A vehicle as in claim 1, wherein said conveyor is a belt-type conveyor with an endless belt driven by said motor, said belt supporting a plurality of paddles for transporting granular material along an interior of said conveyor housing.

4. A storage and transport vehicle comprising:
   a. a discharge point;
   b. a storage bin connected to said discharge point;
   c. a conveyor detachably connectable to said discharge point, said conveyor including an elongate housing; and
   d. a conveyor support structure, said support structure including a swivel assembly attaching said conveyor housing to said support structure, said swivel assembly allowing said conveyor to be selectively swiveled at least 180 degrees about said support structure said swivel assembly comprising
   e. a swivel plate rigidly secured about said conveyor housing; and
   f. a swivel ring assembly pivotably attached to said support structure, said swivel ring assembly accommodating said swivel plate such that said swivel plate, and said attached conveyor, can be freely swiveled about a longitudinal axis of said conveyor housing.

5. A vehicle as in claim 4, wherein said swivel ring assembly comprises:
   a. an upper and a lower swivel ring; and
   b. a plurality of bearings connected between said upper and lower swivel rings, said bearings arrayed about the periphery of said swivel plate such that said swivel plate is supported by and can be swiveled relative to said bearings.

6. A storage and transport vehicle comprising:
   a. a discharge point;
   b. a storage bin connecting to said discharge point;
   c. a conveyor detachably connectable to said discharge point, said conveyor including an elongate housing; and
   d. a conveyor support structure, said support structure including a telescoping boom having an inner end pivotably attached to said bin and a swivel assembly pivotably attached proximate an outer end of said boom, said swivel assembly also being attached to said conveyor housing so as to allow said conveyor to be selectively swiveled at least 180 degrees relative to said telescoping boom, and a lifting cylinder attached directly to said telescoping boom, said lifting cylinder selectively lifting said boom and the attached swivel assembly and conveyor.

7. A vehicle as in claim 8, wherein said conveyor includes a drive motor, said vehicle further comprising a remote control which allows an operator to selectively extend and retract said telescoping boom, to selectively extend and retract said lifting cylinder, and to selectively start and stop said conveyor motor.

8. A vehicle as in claim 6, wherein said conveyor is a belt-type conveyor with an endless belt driven by said motor, said belt supporting a plurality of paddles for transporting granular material along an interior of said conveyor housing.

9. A storage and transport vehicle comprising:
   a. a discharge point;
   b. a storage bin connecting to said discharge point;
   c. a conveyor detachably connectable to said discharge point, said conveyor including an elongate housing; and
   d. a conveyor support structure, said support structure including a telescoping boom having an inner end pivotably attached to said bin and a swivel assembly pivotably attached proximate an outer end of said boom, said swivel assembly also being attached to said conveyor housing so as to allow said conveyor to be selectively swiveled at least 180 degrees relative to said telescoping boom said swivel assembly comprising:
      i. a swivel plate rigidly secured about said conveyor housing; and
      ii. a swivel ring assembly pivotably attached to said boom, said swivel ring assembly accommodating said swivel plate such that said swivel plate, and said attached conveyor, can be freely swiveled about a longitudinal axis of said conveyor housing.

10. A conveyor system for attachment to a storage container, said storage container including a discharge point, said system comprising:
    a. a conveyor detachably connectable to said discharge point, said conveyor including an elongate housing;
    b. a conveyor support structure, said support structure including a telescoping boom with an inner end pivotably attachable to said container, and a swivel assembly pivotably attached proximate an outer end of said boom, said swivel assembly also being attached to said conveyor housing so as to allow said conveyor to be selectively swiveled at least 180 degrees relative to said telescoping boom; and
    c. a lifting cylinder attached between said telescoping boom and said container.

11. A conveyor system as in claim 10, said conveyor including a drive motor, said conveyor system further comprising a remote control which allows an operator to selectively extend and retract said telescoping boom, to selectively extend and retract said lifting cylinder, and to selectively start and stop said conveyor motor.

12. A conveyor system as in claim 10, wherein said conveyor is a belt-type conveyor with an endless belt driven by said motor, said belt supporting a plurality of paddles for transporting granular material along an interior of said conveyor housing.

13. A conveyor system for attachment to a storage container, said storage container including a discharge point, said system comprising:
    a. a conveyor detachably connectable to said discharge point, said conveyor including an elongate housing;
    b. a conveyor support structure, said support structure including a telescoping boom with an inner end pivotably attachable to said container, and a swivel assembly pivotably attached proximate an outer end of said boom, said swivel assembly also being attached to said conveyor housing so as to allow said conveyor to be selectively swiveled at least 180 degrees relative to said telescoping boom; and
    c. a lifting cylinder attached to said telescoping boom said swivel assembly comprising
       i. a swivel plate rigidly secured about said conveyor housing; and
       ii. a swivel ring assembly pivotably attached to said boom, said swivel ring assembly accommodating said swivel plate such that said swivel plate, and said attached conveyor, can be freely swiveled about a longitudinal axis of said conveyor housing.

\* \* \* \* \*